United States Patent
Yamashita (10) Patent No.: US 10,257,430 B2
(45) Date of Patent: Apr. 9, 2019

(54) IMAGE PROCESSING APPARATUS FOR DETECTING FLICKER, METHOD OF CONTROLLING THE SAME, AND NON-TRANSITORY STORAGE MEDIUM

(71) Applicant: CANON KABUSHIKI KAISHA, Tokyo (JP)

(72) Inventor: Yusuke Yamashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/478,414

(22) Filed: Apr. 4, 2017

(65) Prior Publication Data

US 2017/0295310 A1  Oct. 12, 2017

(30) Foreign Application Priority Data

Apr. 8, 2016  (JP) .................. 2016-077931

(51) Int. Cl.
 *H04N 5/235* (2006.01)
 *H04N 5/232* (2006.01)
 *H04N 5/378* (2011.01)

(52) U.S. Cl.
 CPC ....... *H04N 5/2357* (2013.01); *H04N 5/23245* (2013.01); *H04N 5/378* (2013.01)

(58) Field of Classification Search
 CPC .. H04N 5/2357; H04N 5/378; H04N 5/23245; H04N 5/23212; H04N 5/32961
 See application file for complete search history.

(56) References Cited

U.S. PATENT DOCUMENTS

| | | | | |
|---|---|---|---|---|
| 8,730,347 B2* | 5/2014 | Hirose | ...................... | G02B 7/28 |
| | | | | 348/226.1 |
| 2012/0162466 A1* | 6/2012 | Katagawa | ............ | H04N 5/2351 |
| | | | | 348/226.1 |
| 2013/0229555 A1* | 9/2013 | Hashimoto | ............ | H04N 5/378 |
| | | | | 348/300 |
| 2015/0281546 A1* | 10/2015 | Okada | .................. | H04N 5/2357 |
| | | | | 348/226.1 |
| 2016/0360093 A1* | 12/2016 | Ikeda | ................... | H04N 5/3696 |

FOREIGN PATENT DOCUMENTS

| | | |
|---|---|---|
| JP | 2001-083407 A | 3/2001 |
| JP | 2013-211833 A | 10/2013 |

* cited by examiner

*Primary Examiner* — Nhan T Tran
(74) *Attorney, Agent, or Firm* — Cowan, Liebowitz & Latman, P.C.

(57) ABSTRACT

An image processing technique that enables accurate detection of a flicker component even when applied to an image pickup device capable of changing a driving method on a region basis within a frame. A flicker detection section detects a flicker component of an image pixel signal read out from the image pickup device having a pixel region for detecting a phase difference. When the driving method is changed to one for performing phase difference detection, the flicker detection section detects a flicker component such that the period of the flicker component in a region used for phase difference detection within the frame coincides with a period of the flicker component in a region not used for phase difference detection.

17 Claims, 9 Drawing Sheets

← REGION FOR PHASE DIFFERENCE DETECTION

IMAGE PROCESSING APPARATUS FOR DETECTING FLICKER, METHOD OF CONTROLLING THE SAME, AND NON-TRANSITORY STORAGE MEDIUM

BACKGROUND OF THE INVENTION

Field of the Invention

The present invention relates to an image processing apparatus including an image pickup apparatus, such as a digital camera, and more particularly to an image pickup technique for detecting a flicker of an image picked up by an image pickup device in which a driving method is changed within a frame on a region-by-region basis.

Description of the Related Art

Some image pickup apparatuses, such as digital cameras, are configured to have an image pickup device for outputting signals required for focus detection, in which microlenses in a two-dimensional array are each provided with a pair of photoelectric converters.

For example, there has been proposed an image pickup apparatus that includes an image pickup device capable of performing addition and non-addition of output signals from a pair of photoelectric converters into which light enters through an associated microlens, on a pixel-by-pixel basis, as desired (Japanese Laid-Open Patent Publication (Kokai) No. 2001-83407).

In Japanese Laid-Open Patent Publication (Kokai) No. 2001-83407, however, in addition to conventional image pixel signals, as many phase-difference detection pixel signals as the conventional image pixel signals are read out. This increases data amount, and can be an obstacle to increasing the number of pixels and the frame rate.

To solve these problems, there has been proposed an image pickup apparatus that reads out a required number of phase-difference detection pixel signals from an image pickup device within one frame period (Japanese Laid-Open Patent Publication (Kokai) No. 2013-211833).

In Japanese Laid-Open Patent Publication (Kokai) No. 2013-211833, however, phase-difference detection pixel signals and image pixel signals are read out from only part of the whole region of the image pickup device, and hence, compared with a region of the image pickup device where only an image pixel signal is read out from each pixel, a readout time period is longer in a region where two readout operations are required for reading out a phase-difference detection pixel signal and reading out an image pixel signal from each pixel. Therefore, when a flicker occurs, a period of change in the light amount of detected flicker is different between the region (lines) where only image pixel signals are read out and the region (lines) where phase-difference detection pixel signals and image pixel signals are read out. This makes it impossible to perform accurate flicker detection.

SUMMARY OF THE INVENTION

The present invention provides an image processing technique that enables accurate detection of a flicker component even when applied to an image pickup device that is capable of changing a driving method thereof, on a region-by-region basis, within a frame.

In a first aspect of the present invention, there is provided an image processing apparatus comprising a image processing apparatus comprising a flicker detection unit configured to detect a flicker component of an image pixel signal, which is read out from an image pickup device that includes a pixel region for phase difference detection and is capable of changing a driving method, on a region-by-region basis, within a frame, wherein in a case where the driving method for driving the image pickup device is changed to a driving method for performing phase difference detection, the flicker detection unit detects the flicker component such that, within the frame, a period of the flicker component in a region used for phase difference detection coincides with a period of the flicker component in a region not used for phase difference detection.

In a second aspect of the present invention, there is provided an image processing apparatus comprising a drive unit configured to be capable of changing, within one frame, a driving method for driving an image pickup device between a first driving method in which a time period required to complete readout of a pixel signal output from one line of the image pickup device is different, on a region-by-region basis, in the image pickup device, and a second driving method in which the time period is approximately equal between regions of the image pickup device, and a flicker detection unit configured to perform flicker detection processing based on a pixel signal read out from the image pickup device, wherein the flicker detection unit makes lines of the image pickup device each for reading out a pixel signal used in the same flicker detection processing, different between a case where the image pickup device is driven by the first driving method and a case where the image pickup device is driven by the second driving method.

In a third aspect of the present invention, there is provided a method of controlling an image processing apparatus including an image pickup device that includes a pixel region for phase difference detection and is capable of changing a driving method, on a region-by-region basis, within a frame, the method comprising detecting a flicker component of an image pixel signal read out from the image pickup device, wherein in a case where the driving method for driving the image pickup device is changed to a driving method for performing phase difference detection, said detecting a flicker component includes detecting the flicker component such that, within the frame, a period of the flicker component in a region used for phase difference detection coincides with a period of the flicker component in a region not used for phase difference detection.

In a fourth aspect of the present invention, there is provided a method of controlling an image processing apparatus, comprising performing flicker detection processing based on pixel signals read out from an image pickup device that is capable of changing, within one frame, a driving method for driving the image pickup device between a first driving method in which a time period required to complete readout of a pixel signal output from one line of the image pickup device is different, on a region-by-region basis, in the image pickup device, and a second driving method in which the time period is approximately equal between regions of the image pickup device, and wherein said flicker detection processing includes making lines of the image pickup device each for reading out a pixel signal used in the same flicker detection processing, different between a case where the image pickup device is driven by the first driving method and a case where the image pickup device is driven by the second driving method.

In a fifth aspect of the present invention, there is provided a non-transitory computer-readable storage medium storing a computer-executable program for executing a method of controlling an image processing apparatus including an image pickup device that includes a pixel region for phase difference detection and is capable of changing a driving method, on a region-by-region basis, within a frame, wherein the method comprises detecting a flicker component of an image pixel signal read out from the image pickup device, wherein in a case where the driving method for driving the image pickup device is changed to a driving method for performing phase difference detection, said detecting a flicker component includes detecting the flicker component such that, within the frame, a period of the flicker component in a region used for phase difference detection coincides with a period of the flicker component in a region not used for phase difference detection.

In a sixth aspect of the present invention, there is provided a non-transitory computer-readable storage medium storing a computer-executable program for executing a method of controlling an image processing apparatus, wherein the method comprises performing flicker detection processing based on pixel signals read out from an image pickup device that is capable of changing, within one frame, a driving method for driving the image pickup device between a first driving method in which a time period required to complete readout of a pixel signal output from one line of the image pickup device is different, on a region-by-region basis, in the image pickup device, and a second driving method in which the time period is approximately equal between the regions of the image pickup device, and wherein said flicker detection processing includes making lines of the image pickup device each for reading out a pixel signal used in the same flicker detection processing, different between a case where the image pickup device is driven by the first driving method and a case where the image pickup device is driven by the second driving method.

According to the present invention, it is possible to accurately detect a flicker component even when an image pickup device is configured to be capable of changing a driving method thereof, on a region-by-region basis, within a frame.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
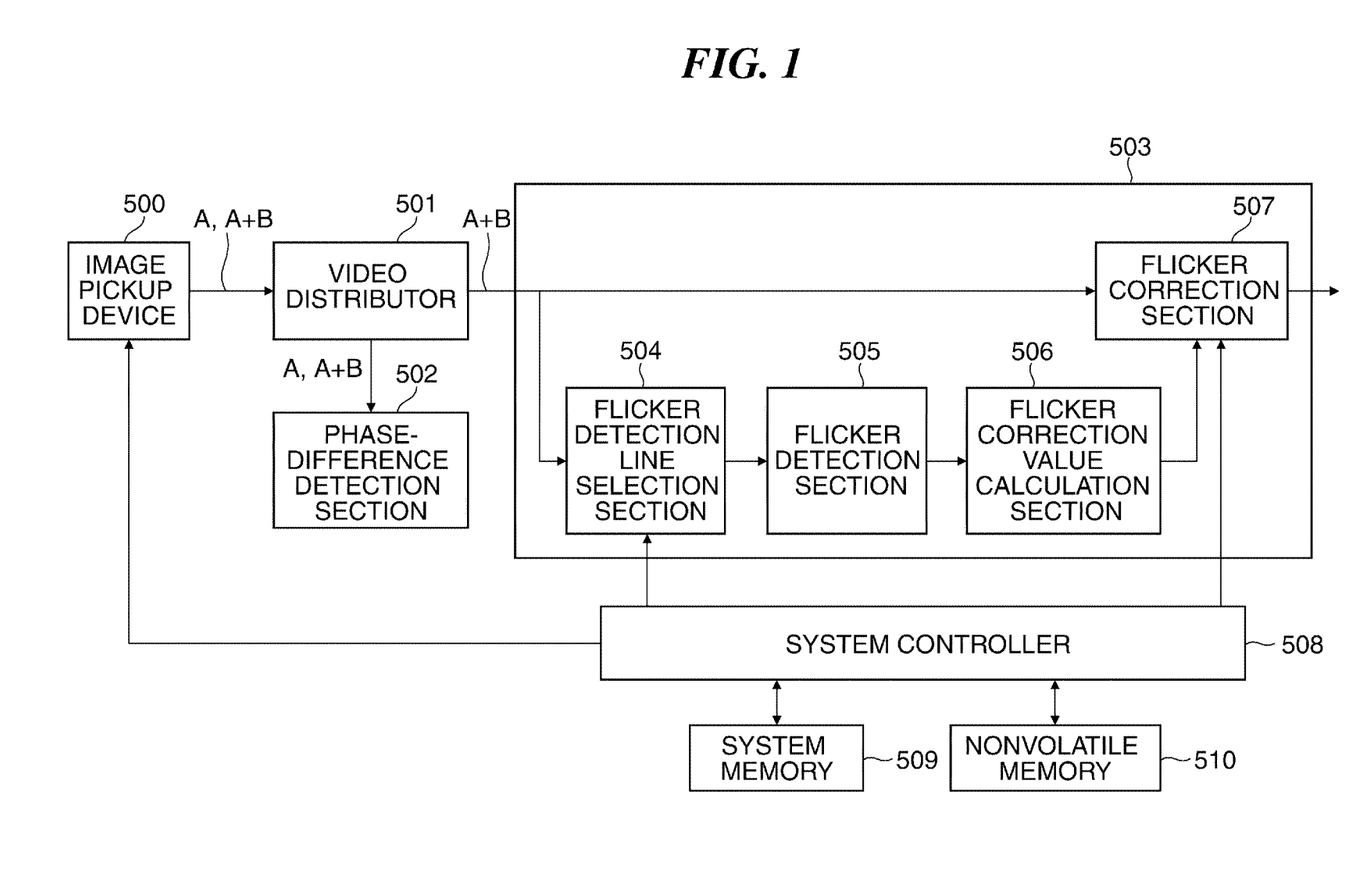
FIG. 1 is a block diagram of the system configuration of a digital camera as an image processing apparatus according to a first embodiment of the present invention.

FIG. 1 is a block diagram of the system configuration of a digital camera as an image processing apparatus according to a first embodiment of the present invention. Note that, for convenience of explanation, FIG. 1 mainly shows components of the digital camera which are related to detection and correction of a flicker of an image picked up by an image pickup device, which form essential parts of the present invention, and a known circuit configuration other than these components is omitted from illustration.

As shown in FIG. 1, in the digital camera according to the present embodiment, pixel signals A and A+B are output from the image pickup device 500 implemented e.g. by a CMOS sensor, and are input to a video distributor 501.

The video distributor 501 outputs image pixel signals (A+B signals) to a flicker detection and correction section 503, and outputs phase-difference detection pixel signals (signals A and A+B) to a phase-difference detection section 502. The phase-difference detection section 502 detects a phase difference based on the phase-difference detection pixel signals (signals A and A+B) output from the video distributor 501.

The flicker detection and correction section 503 is a circuit for detecting and correcting a flicker, and includes a flicker detection line selection section 504, a flicker detection section 505, a flicker correction value calculation section 506, and a flicker correction section 507.

Only the image pixel signals (A+B signals) are output from the video distributor 501 to the flicker detection line selection section 504 and the flicker correction section 507. The flicker detection line selection section 504 selects flicker detection lines according to a change in a driving method for driving the image pickup device 500. The flicker detection section 505 detects a flicker component of the image pixel signals (A+B signals). Note that as a method of detecting a flicker component, there may be employed any method insofar as it is a known method. In the present embodiment, flicker detection is performed by analyzing image signals acquired over an accumulation time period which is not shorter than one light amount change period of a flicker (hereinafter simply referred to as the "flicker period") which is envisaged, and comparing differences in brightness caused by a flicker on a screen associated with the image signals.

The flicker correction value calculation section 506 calculates a flicker correction value for each of different drive regions of the image pickup device 500, according to a period (or a frequency component) of a flicker detected by the flicker detection section 505. The flicker correction section 507 performs flicker correction of the A+B signals based on the flicker correction value calculated by the flicker correction value calculation section 506.

In the present embodiment, the flicker correction section 507 performs flicker correction by outputting an image signal which is reduced in the influence of a flicker. More specifically, the flicker correction section 507 acquires an image signal from which a flicker component is eliminated, by subtracting the flicker correction value generated by the flicker correction value calculation section 506 from the image pixel signal (A+B signal) output from the video distributor 501. Note that the flicker correction method is not limited to this. For example, the flicker detection section 505 may detect a period or frequency of a flicker, and acquire image signals at such a shutter speed that reduces the influence of a flicker, according to the type of the detected flicker, thereby performing the flicker correction. Further, the flicker correction may be performed by performing image pickup according to a timing, such as a peak timing or a bottom timing, of a detected flicker, at which the influence of the flicker is reduced. Furthermore, the flicker correction may be performed by performing image processing for reducing the influence of a flicker on the acquired image signals.

A system controller 508 is comprised of a CPU or an MPU, and controls the overall operation of the camera. The image pickup device 500 controls the shutter speed, gains, and a pixel acquisition region for detecting the phase difference, based on a signal from the system controller 508. Further, the flicker detection and correction section 503 performs selection of a flicker detection line for each of the different drive regions of the image pickup device 500, based on a signal from the system controller 508.

A system memory 509 stores various data for operation of the system controller 508. Further, the system memory 509 is capable of being used as a work region for the system controller 508. A nonvolatile memory 510 is formed e.g. by a flash ROM, in which program codes executed by the system controller 508 and various data are written.

Figure 2:
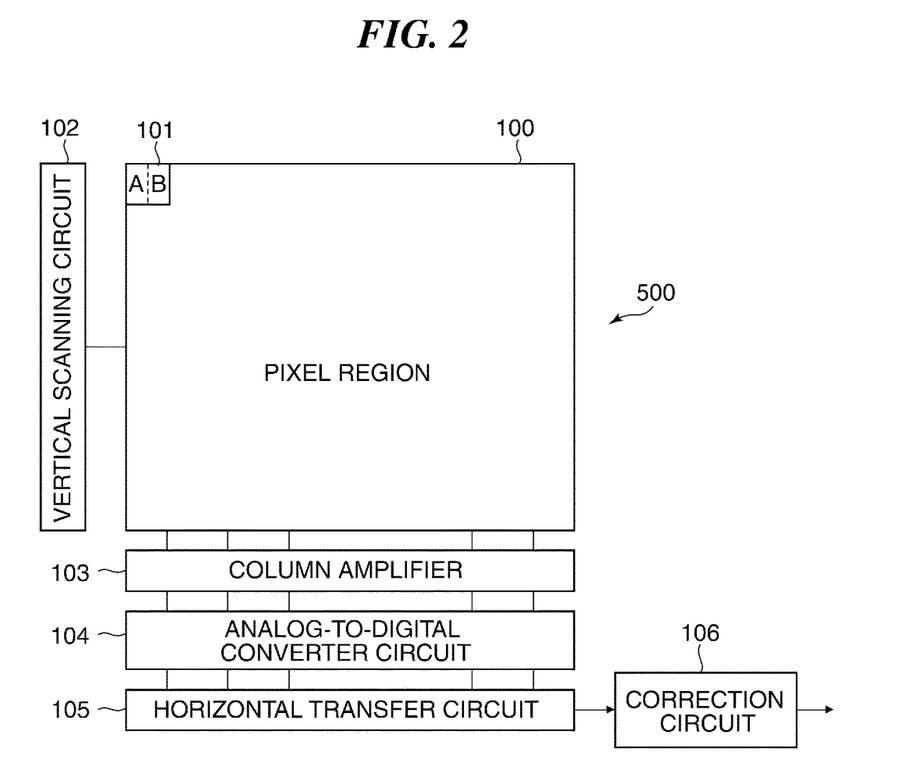
FIG. 2 is a block diagram useful in explaining an example of the configuration of an image pickup device.

FIG. 2 is a block diagram useful in explaining an example of the configuration of the image pickup device 500. As shown in FIG. 2, the image pickup device 500 includes a pixel region 100, a vertical scanning circuit 102, a column amplifier 103, an analog-to-digital converter circuit 104, a horizontal transfer circuit 105, and a correction circuit 106.

In the pixel region 100, there are arranged unit pixels 101 each comprised of photoelectric conversion photo diodes 201 and 202 (see FIG. 3), described hereinafter, in a row direction. Each unit pixel 101 includes pixels (hereinafter referred to as the "divided pixels A and B") obtained by dividing one pixel into two pupils with respect to one micro lens. Focus detection is performed based on phase difference information of output signals from the divided pixels A and B, and a photographed image is generated by adding the output signals from the divided pixels A and B to each other.

The vertical scanning circuit 102 performs timing control for sequentially reading the voltages of pixel signals from the pixel region 100 into one frame. In general, image signals (pixel signals) are sequentially read out in units of rows from the uppermost row to the lowermost row of one frame. Further, the vertical scanning circuit 102 also performs the control for reading out image pixel signals (hereinafter each referred to as "the A+B signal") each generated by adding a divided pixel A and a divided pixel B to each other, and phase-difference detection pixel signals (hereinafter each referred to as "the A signal").

The column amplifier 103 is used for electrically amplifying pixel signals read out from the pixel region 100. The column amplifier 103 amplifies pixel signal levels with respect to noise generated by the analog-to-digital converter circuit 104, to thereby uniformly improve the S/N ratio.

The analog-to-digital converter circuit 104 converts the voltages of the pixel signals from the unit pixels 101 forming the pixel region 100 to digital signals. Pixel data items converted to the digital signals by the analog-to-digital converter circuit 104 are sequentially read out by the horizontal transfer circuit 105, and outputs from the horizontal transfer circuit 105 are input to the correction circuit 106. The correction circuit 106, which is a digital signal processing circuit, is capable of performing not only offset correction, such as FPN correction, by digital processing, but also quick and easy gain-based calculation by a shift operation and multiplication.

Figure 3:
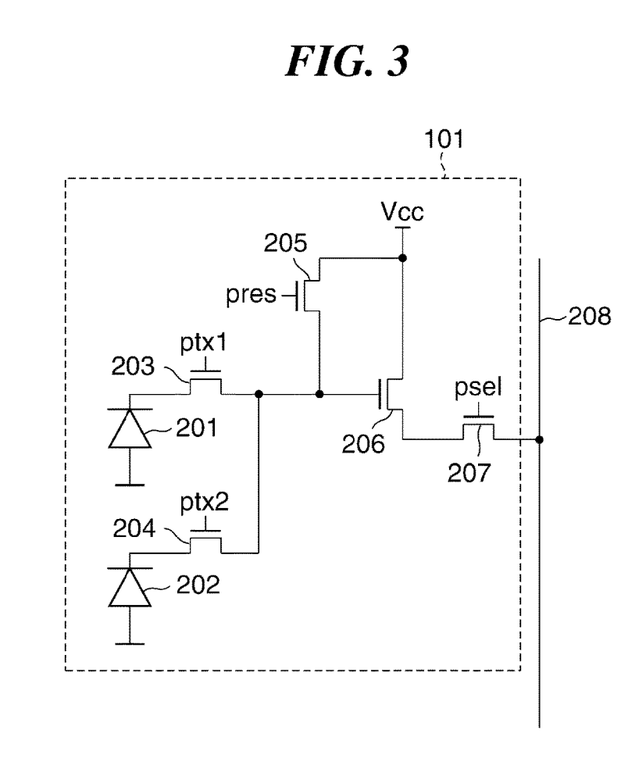
FIG. 3 is a circuit diagram useful in explaining an example of the configuration of each of unit pixels which form a pixel region of the image pickup device.

FIG. 3 is a circuit diagram useful in explaining an example of the configuration of each of the unit pixels 101 that form the pixel region 100 of the image pickup device 500. As shown in FIG. 3, the unit pixel 101 includes the two photo diodes 201 and 202. The photo diodes 201 and 202 convert received light to charge signals. Here, a signal from the photo diode (first photoelectric converter) 201 is the aforementioned A signal, and a signal from the photo diode (second photoelectric converter) 202 is referred to as a B signal.

In the example illustrated in FIG. 3, the photo diodes 201 and 202 have anode sides connected to ground, and cathode sides thereof are connected to a gate of an amplifier MOS transistor 206 via a transfer MOS transistor 203 and a transfer MOS transistor 204, respectively.

Further, a reset MOS transistor 205 has its source connected to the gate of the amplifier MOS transistor 206, and has its drain connected to a power supply voltage Vcc. Furthermore, the amplifier MOS transistor 206 has its drain connected to the power supply voltage Vcc, and has its source connected to a drain of a selection MOS transistor 207.

The signal from the unit pixel 101 is output to a vertical signal line 208 and the column amplifier 103. Read-out timings of the transfer MOS transistor 203, the transfer MOS transistor 204, the reset MOS transistor 205, and the selection MOS transistor 207 are controlled by the vertical scanning circuit 102.

Figure 4:
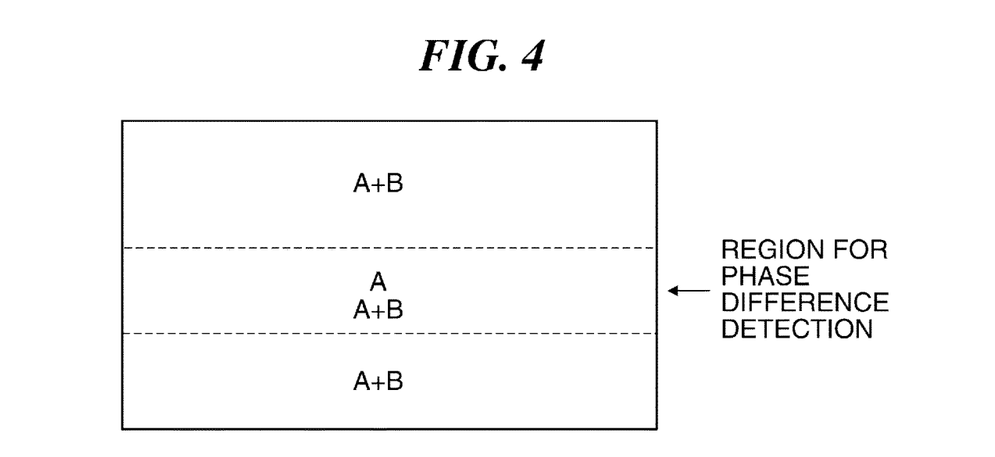
FIG. 4 is a region diagram of the image pickup device in a case where a phase-difference detection pixel signal is read out from only part of the whole pixel region of the image pickup device.

FIG. 4 is a region diagram of the image pickup device 500 in a case where the phase-difference detection pixel signals are read out from only part of the whole pixel region 100. As shown in FIG. 4, only the A+B signals are read out from regions which are not used for phase difference detection, and not only the A+B signals but also the A signals for the phase difference detection are read out from a region which is used for phase difference detection. Note that the present embodiment is configured such that the transfer and readout of charges accumulated in respective pixels via the lines of the image pickup device 500 are performed on a line-by-line basis.

Figure 5A:
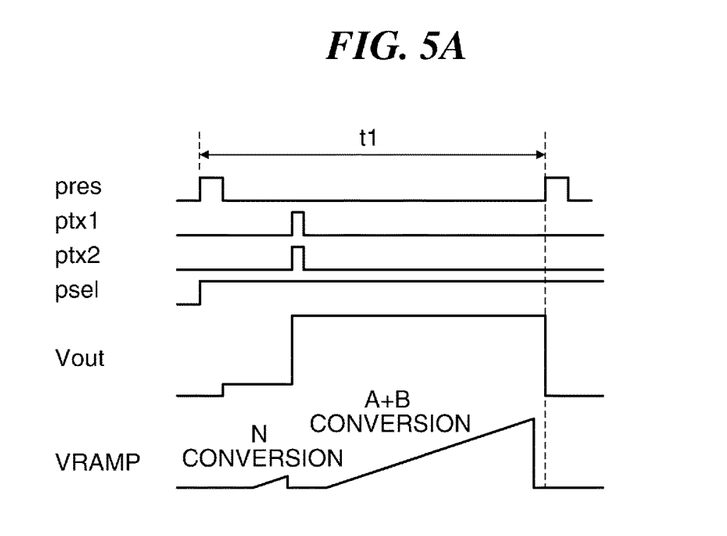
FIGS. 5A and 5B are timing diagrams useful in explaining an analog-to-digital conversion operation performed in the image pickup device.

FIG. 5A is a timing diagram useful in explaining an analog-to-digital conversion operation performed by the analog-to-digital converter circuit 104 in the case where only the A+B signal is read out.

In FIG. 5A, a reset pulse pres is a signal supplied to the reset MOS transistor 205. Transfer pulses ptx1 and ptx2 are signals supplied to the transfer MOS transistors 203 and 204 for causing the respective A signal and B signal from the photo diodes 201 and 202 to be transferred therefrom. A selection pulse psel is a signal supplied to the selection MOS transistor 207 for causing the A signal and B signal to be transferred to the vertical signal line 208. Vout represents the level of an analog signal output from the column amplifier 103. A symbol VRAMP represents a ramp signal. By comparing the ramp signal VRAMP and the A+B signal, the analog-to-digital converter circuit 104 performs the analog-to-digital conversion. A symbol t1 represents a time period taken to perform the above-described processing.

First, the reset pulse pres is set to a high level (H level), whereby the input node of the amplifier MOS transistor 206 is set to a potential at a reset level. Further, the selection pulse psel is set to an H level. With this, the A+B signal obtained when the potential of the input node of the amplifier MOS transistor 206 is at the reset level is output to the vertical signal line 208.

Next, the reset pulse pres is set to a low level (L level), whereby a noise component (N signal) is output to perform analog-to-digital conversion processing. Afterwards, it is possible to obtain a signal in which the noise component is suppressed, by calculating a difference between the noise component and the A+B signal.

Next, the transfer pulses ptx1 and ptx2 are set to the H level. This causes signal charges generated by photoelectric conversion at the photo diodes 201 and 202 to be transferred to the input node of the amplifier MOS transistor 206, whereby the A+B signal for image formation is output to the vertical signal line 208, and the analog-to-digital conversion processing of the A+B signal is performed.

Figure 5B:
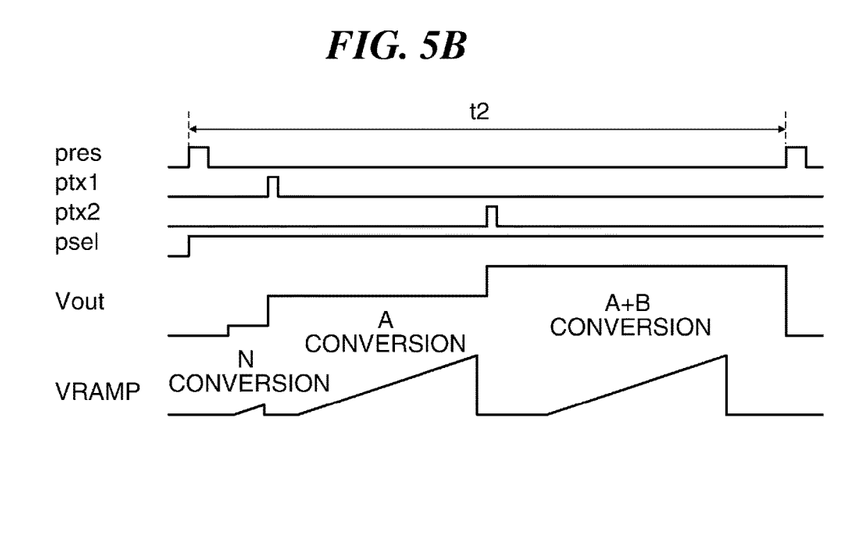

FIG. 5B is a timing diagram useful in explaining the analog-to-digital conversion operation performed by the analog-to-digital converter circuit 104 in the case where the A signal and the A+B signal are read out.

First, similar to FIG. 5A, processing up to a point where the noise component (N signal) is output is performed. Next, the transfer pulse ptx1 is set to the H level. This causes a signal charge generated by photoelectric conversion only at the photo diode 201 to be transferred to the input node of the amplifier MOS transistor 206. That is, only the A signal for phase difference detection is output to the vertical signal line 208. Therefore, in the analog-to-digital converter circuit 104, first, the analog-to-digital conversion processing of the A signal alone is performed.

After termination of the analog-to-digital conversion processing of the A signal, the transfer pulse ptx2 is set to the H level. This causes signal charges generated by photoelectric conversion at the photo diodes 201 and 202 to be transferred to the input node of the amplifier MOS transistor 206, whereby the A+B signal as a pixel signal is output to the vertical signal line 208, and the analog-to-digital conversion processing of the A+B signal is performed. A symbol t2 represents a time period taken to perform the above-described processing.

Thus, in the region (FIG. 5B) which is used for phase difference detection, since the A signal is read out in addition to the A+B signal, it takes twice long readout time (t2=t1×2) for this region as compared with the region (FIG. 5A) from which only the A+B signal is read out, i.e. the region which is not used for phase difference detection.

Figure 6A:
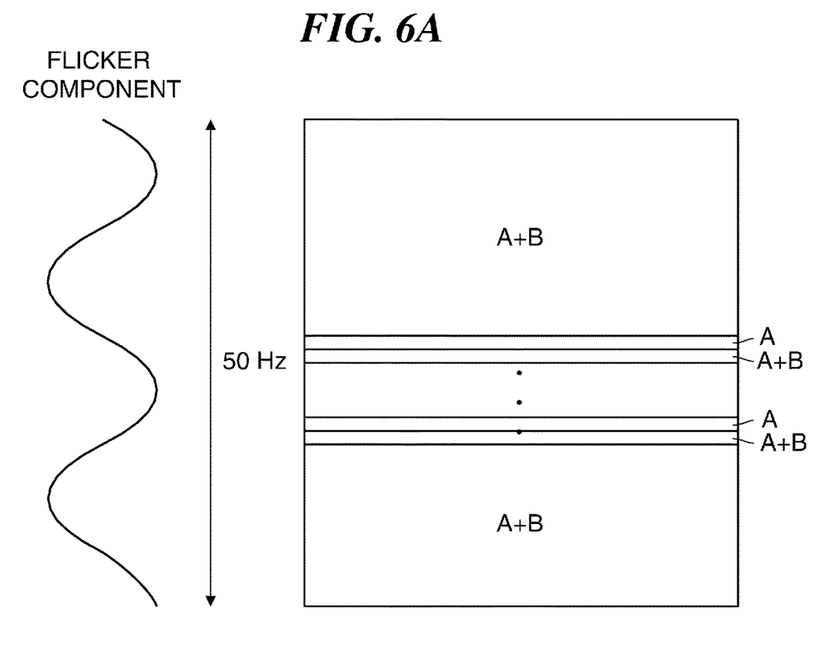
FIGS. 6A and 6B are diagrams useful in explaining that in a region used for phase difference detection, a flicker period is different between a pixel signal read out from the image pickup device and a pixel signal input to a flicker detection and correction section.
Figure 6B:
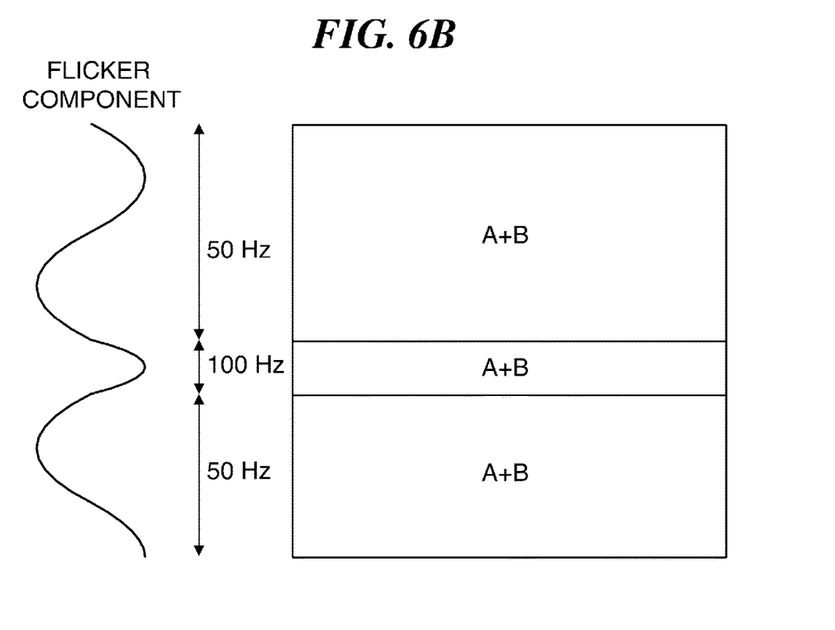

FIGS. 6A and 6B are diagrams useful in explaining that in the region used for phase difference detection, a flicker period is different between a pixel signal read out from the image pickup device 500 and a pixel signal input to the flicker detection and correction section 503.

FIG. 6A is a diagram showing a relationship between pixel signal(s) read out from the image pickup device 500 and a flicker component thereof, and FIG. 6B is a diagram showing a relationship between a pixel signal input to the flicker detection and correction section 503 and a flicker component thereof. Here, a case is assumed where a flicker with a period of 50 Hz occurs, by way of example.

Referring to FIG. 6A, although in the region used for phase difference detection, the A+B signal and the A signal are read out from the image pickup device 500, the A signal is not input to the flicker detection and correction section 503, and hence the pixel signal input to the flicker detection and correction section 503 is only the A+B signal, as shown in FIG. 6B.

Therefore, in the region of the image pickup device 500 which is used for phase difference detection, compared with a case in which only the A+B signal is read out (corresponding to a central region in FIG. 6B), a readout time for one line of signals and a flicker period in the region from which the A+B signal and the A signal are read out (central region in FIG. 6A) are two times long in period (i.e. half in frequency), respectively. Therefore, when attention is paid to the pixel signal input to the flicker detection and correction section 503, a flicker detected based on pixel signals associated with the region of the image pickup device 500 which is used for phase difference detection has a period approximately half as long as (i.e. a frequency approximately two times as high as) a flicker detected based on pixel signals associated with the region of the image pickup device 500 which is not used for phase difference detection. Thus, the flicker detection period in the region of the image pickup device 500 which is used for phase difference detection and the flicker detection period in the region of the image pickup device 500 which is not used for phase difference detection are different from each other, so that it is impossible to properly detect a flicker having occurred. This causes flicker correction to be performed based on an erroneously detected flicker, which leads to acquisition of an image which is unnatural in brightness, against a user's intention.

Therefore, in the present embodiment, this problem is solved by controlling the driving of the image pickup device 500 such that the difference between the flicker detection period in the region used for phase difference detection and the flicker detection period in the region not used for phase difference detection is controlled to a level at which the flicker detection is not affected.

Figure 7:
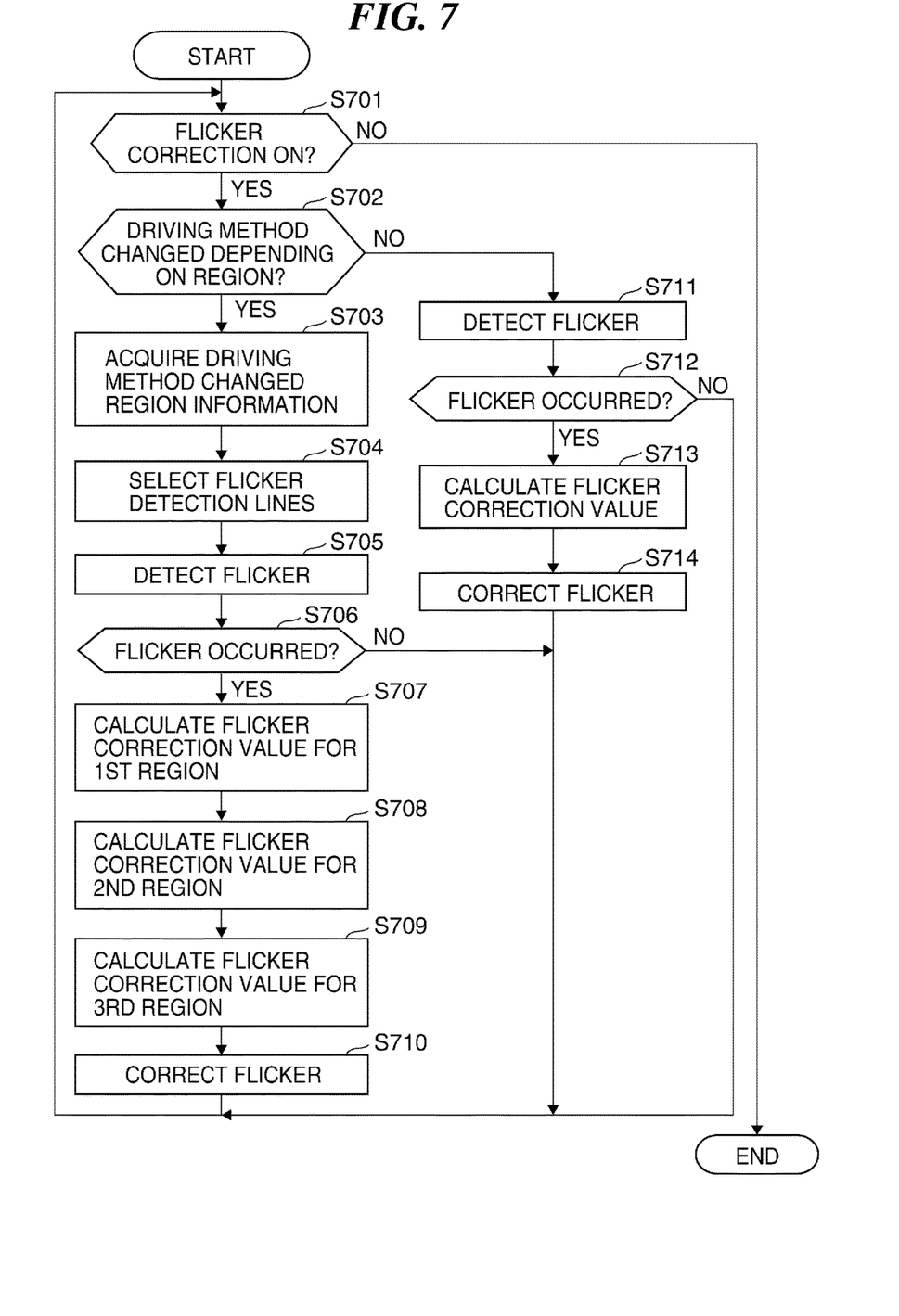
FIG. 7 is a flowchart of a flicker correction process by the camera.

FIG. 7 is a flowchart of a flicker correction process by the camera under the control of the system controller 508. The flicker correction process shown in FIG. 7 is performed by the CPU and the like of the system controller 508 which executes a program loaded from a storage section, such as the nonvolatile memory 510, into the system memory 509. In the following description, regions which are not used for phase difference detection in one frame of the image pickup device 500 are referred to as the first region and the third region (denoted as 1ST REGION and 3RD REGION in associated figures), and a region which is used for phase difference detection (region from which the A+B signal and the A signal are read out) is referred to as the second region (denoted as 2ND REGION in the associated figures).

Referring to FIG. 7, in a step S701, the system controller 508 determines whether the flicker correction is on or off. If the flicker correction is on, the system controller 508 proceeds to a step S702, whereas if the flicker correction is off, the system controller 508 terminates the present process. In the step S702, the system controller 508 determines whether or not in the frame of the image pickup device 500, there is a pixel region in which the driving method is changed to one for performing phase difference detection. If there is a pixel region in which the driving method is changed, the system controller 508 proceeds to a step S703, whereas if not, the system controller 508 proceeds to a step S711.

In the step S703, the system controller 508 acquires information on the pixel region in which the driving method for driving the image pickup device 500 is changed, and then proceeds to a step S704. In the step S704, the system controller 508 causes the flicker detection line selection section 504 to select flicker detection lines in different regions, on a region-by-region basis, based on the pixel region information acquired in the step S703, and then proceeds to a step S705.

In the step S704, the system controller 508 selects flicker detection lines for the A+B signal input to the flicker detection line selection section 504 such that the flicker frequency (or the light amount change period) in the second region and the flicker frequency (or the light amount change period) in the first and third regions coincide with (or approximately coincide with) each other. In the present embodiment, the system controller 508 performs thinning-out lines associated with the first and third regions such that the flicker frequency (or the light amount change period) in the second region and the flicker frequency (or the light amount change period) in the first and third regions coincide with each other. As a consequence, in the second region used for phase difference detection, it is possible to make the readout time for one line of signals and the flicker period identical between the cases of FIGS. 6A and 6B. Although it is preferable that the number of flicker detection lines in the first and third regions coincides with that of flicker detection lines in the second region, the number of flicker detection lines in the first and third regions may be different from that of flicker detection lines in the second region, insofar as the difference therebetween does not cause erroneous detection of flicker.

In the step S705, the system controller 508 causes the flicker detection section 505 to detect a flicker component from the flicker detection lines selected in the step S704, and then proceeds to a step S706. More specifically, the system controller 508 performs the same flicker detection process, i.e. the flicker detection process on the whole screen (frame), using respective pixel signals read out from the first and third regions and the second region between which the flicker detection lines are different.

In the step S706, the system controller 508 determines whether or not a flicker has occurred in the frame, based on information on the flicker component detected in the step S705. If a flicker has occurred, in steps S707 to S709, the system controller 508 causes the flicker correction value calculation section 506 to calculate, based on the flicker components detected in the step S705, flicker correction values for the first to third regions, respectively, on a region-by-region basis, and then proceeds to a step S710. Further, if it is determined in the step S706 that no flicker has occurred, the system controller 508 returns to the step S701, and continues the steps subsequent thereto.

In the step S710, the system controller 508 causes the flicker correction section 507 to perform flicker correction in the first to third regions, on a region-by-region basis, based on the flicker correction values calculated in the steps S707 to S709, and then returns to the step S701 to continue the steps subsequent thereto.

On the other hand, in the step S711 et seq., since the driving method for driving the image pickup device 500 is not changed to one for phase difference detection, normal processing is performed. More specifically, in the step S711, the system controller 508 does not perform the selection of flicker detection lines using the flicker detection line selection section 504 but causes the flicker detection section 505 to detect flicker components from all the flicker detection lines, and then proceeds to a step S712.

In the step S712, the system controller 508 determines whether or not a flicker has occurred, based on information on the flicker components detected in the step S711. If no flicker has not occurred, the system controller 508 returns to the step S701, whereas if a flicker has occurred, the system controller 508 proceeds to a step S713.

In the step S713, the system controller 508 causes the flicker correction value calculation section 506 to calculate a flicker correction value, and then proceeds to a step S714. In the step S714, the system controller 508 causes the flicker correction section 507 to perform flicker correction based on the flicker correction value calculated in the step S713, and then returns to the step S701 to continue the steps subsequent thereto. Although the present embodiment is configured such that processing associated with the detection and correction of a flicker, as shown in FIG. 7, is performed on a frame-by-frame basis according to the driving frame rate of the image pickup device 500, the processing may be performed for each of a predetermined number of frames. Further, although in the present embodiment, the case where one region is provided for the phase difference detection has been described, by way of example, even in a case where two or more regions are provided for phase difference detection, the detection and the correction of flicker are similarly performed for each region.

As described heretofore, in the present embodiment, in the case where there is a pixel region in which the driving method is changed to one for phase difference detection within the frame of the image pickup device 500, flicker detection lines are selected such that the flicker frequency (or light amount change period) in the second region and the flicker frequency (or light amount change period) in the first and third regions coincide with each other during correction of flicker.

Then, flicker components are detected from the selected flicker detection lines to calculate flicker correction values for the first to third regions, on a region-by-region basis, and then flicker correction is performed based on the calculated flicker correction values. This makes it possible to accurately detect and correct a flicker even when the image pickup device 500 is configured such that the driving method thereof is changed within the frame, on a region-by-region basis.

Figure 8:
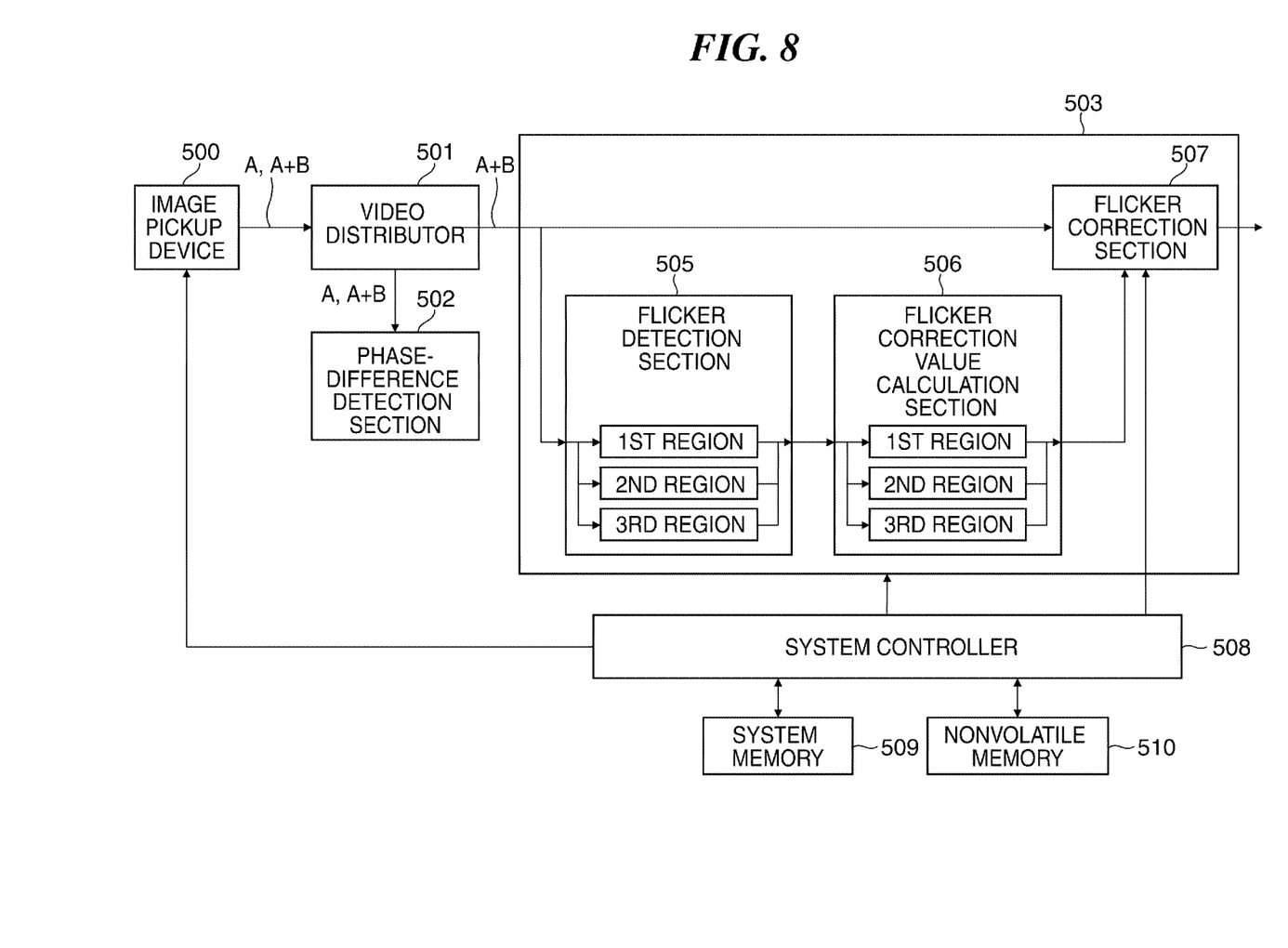
FIG. 8 is a block diagram of the system configuration of a digital camera as an image processing apparatus according to a second embodiment of the present invention.

Next, a digital camera as an image processing apparatus according to a second embodiment of the present invention will be described with reference to FIGS. 8 and 9. FIG. 8 is a block diagram of the system configuration of the digital camera according to the present embodiment. Note that in the present embodiment, redundant description of components identical or corresponding to those of the above-described first embodiment is omitted while denoting them by the same reference numerals, and the following description is given of only different points from the first embodiment.

As shown in FIG. 8, the present embodiment is different in processing by the flicker detection section 505 from the above-described first embodiment (FIG. 1). Further, the present embodiment is not provided with the flicker detection line selection section 504 for selecting flicker detection lines.

In a case where the driving method for driving the image pickup device 500 is changed within the frame, on a region-by-region basis, the flicker detection section 505 detects a frequency component (or light amount change period) of a flicker in each of the first to third regions different from each other. The flicker correction value calculation section 506 calculates a flicker correction value for each of the first to third regions according to an associated one of the frequency components of the flicker detected by the flicker detection section 505 in the first to third regions different from each other.

Figure 9:
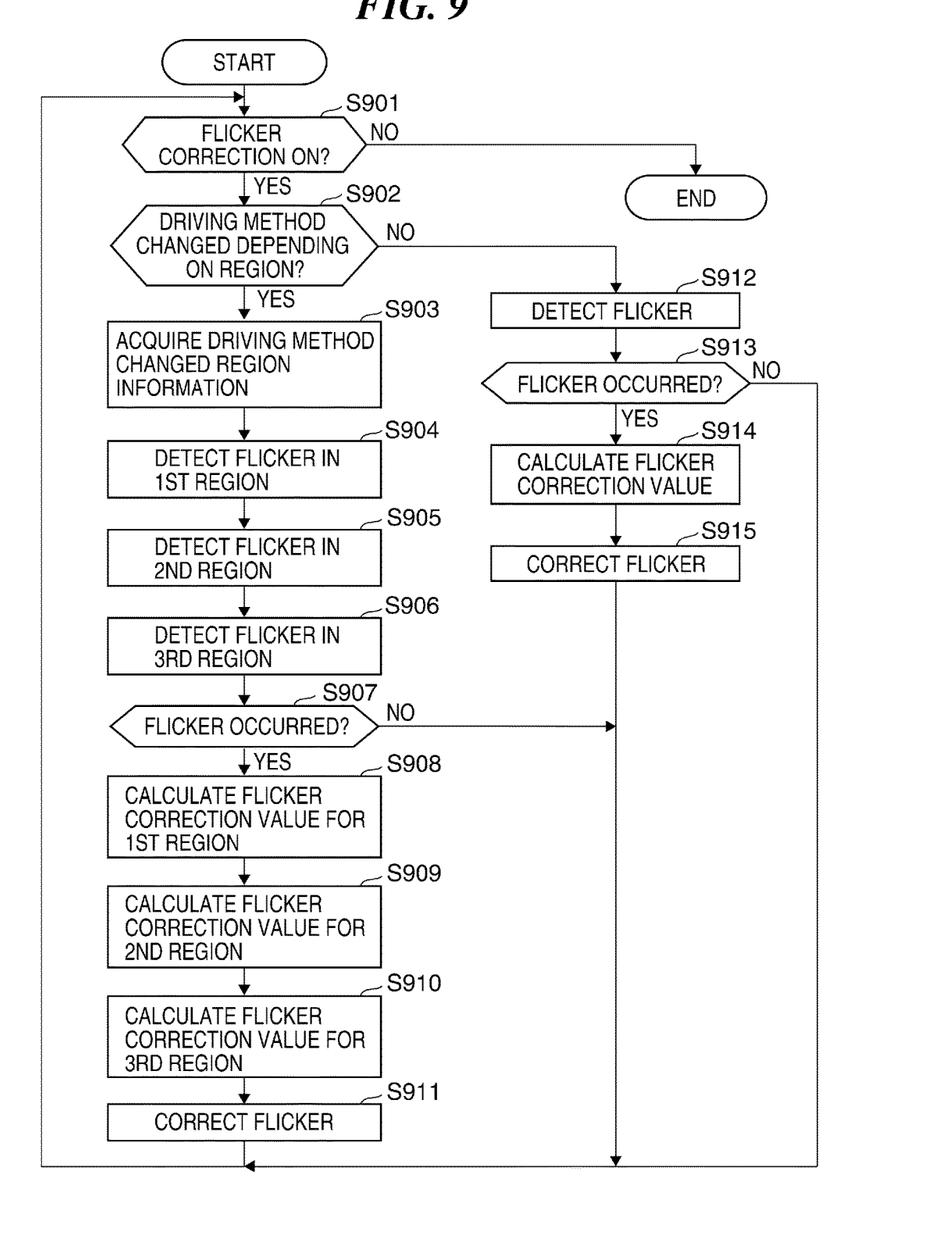
FIG. 9 is a flowchart of a flicker correction process performed by the digital camera.

FIG. 9 is a flowchart of a flicker correction process performed by the camera under the control of the system controller 508 thereof. The flicker correction process shown in FIG. 9 is performed by the CPU and the like of the system controller 508 which executes a program loaded from a storage section, such as the nonvolatile memory 510, into the system memory 509.

Referring to FIG. 9, similar to the steps S701 and S702 in the above-described first embodiment, if it is determined in a step S901 that the flicker correction is on, the system controller 508 determines in a step S902 whether or not there is a pixel region in which the driving method is changed. If there is a pixel region in which the driving method is changed, the system controller 508 proceeds to a step S903, whereas if not, the system controller 508 proceeds to a step S912. In the step S903, the system controller 508 acquires information on the pixel region in which the driving method for driving the image pickup device 500 is changed, and then proceeds to a step S904.

Then, the system controller 508 causes the flicker detection section 505 to detect, based on the pixel region information acquired in the step S903, flicker components in the first to third regions, on a region-by-region basis, in respective steps S904 to S906. More specifically, the system controller 508 performs the same flicker detection processing using pixel signals read out, on a region-by-region basis, to thereby perform the flicker detection processing on the whole screen (frame). Then, the system controller 508 proceeds to a step S907.

In the steps S904 to S906, the system controller 508 detects a flicker component in the second region used for phase difference detection at a period which is two times (or approximately two times) as long as a period at which the system controller 508 detects a flicker component in the first and third regions not used for phase difference detection. More specifically, a light amount change period for determining detection of a flicker, which is used for detecting a flicker in the second region, is increased according to the types (the number thereof) of pixel signals read out from the same line of the image pickup device 500. In other words, a detection period used for determining a flicker light amount change period which has occurred is made different between the region used for phase difference detection and the regions not used for phase difference detection. For example, in a case where a flicker with a frequency of 100 Hz is to be detected, it is determined, in the second region, if a flicker with a light amount change period corresponding to a frequency of 200 Hz has been detected, that a flicker with a frequency of 100 Hz has occurred. As a consequence, in the second region used for phase difference detection, it is possible to make the readout time for one line of signals and the flicker period identical between the cases of FIGS. 6A and 6B.

Although in the present embodiment, the description is given of the case where the A signal and the A+B signal are read out from the second region used for phase difference detection, this is not limitative. For example, in a case where the A+B signal is read out from the first region, and the A signal, the B signal, and the A+B signal are read out from the second region, the system controller 508 is only required to make the flicker detection period in the second region three times as long as that of the first and third regions. Further, although in the present embodiment, the flicker detection period in the region used for phase difference detection is made two times as long as the flicker detection period in the regions not used for phase difference detection, this is not limitative. For example, if an influence given to the detection of a flicker is small, the flicker detection period in the region used for phase difference detection may not be a strict multiple of the flicker detection period in the region not used for phase difference detection.

In the step S907, the system controller 508 determines whether or not a flicker has occurred in the frame, based on information on the flicker components in the different regions, detected in the steps S904 to S906. If a flicker has occurred, the system controller 508 causes the flicker correction value calculation section 506 to calculate, based on the information on the flicker components detected in the different regions in the steps S904 to S906, flicker correction values for associated ones of the first to third regions.

More specifically, in a step S908, the system controller 508 causes the flicker correction value calculation section 506 to calculate a flicker correction value for the first region based on the information on the flicker component detected in the first region in the step S904, and then proceeds to a step S909.

In the step S909, the system controller 508 causes the flicker correction value calculation section 506 to calculate a flicker correction value for the second region based on the information on the flicker component (twofold flicker period) detected in the second region in the step S905, and then proceeds to a step S910.

In the step S910, the system controller 508 causes the flicker correction value calculation section 506 to calculate a flicker correction value for the third region based on the information on the flicker component detected in the third region in the step S906, and then proceeds to a step S911. Further, if it is determined in the step S907 that no flicker has occurred, the system controller 508 returns to the step S901, and continues the steps subsequent thereto.

In the step S911, the system controller 508 causes the flicker correction section 507 to correct flickers having occurred in the respective first to third regions based on the flicker correction values calculated on a region-by-region basis in the steps S908 to S910, and then returns to the step S901 to continue the steps subsequent thereto.

On the other hand, in the step S912, since the flicker detection line selection section 504 is not provided in the present embodiment, the system controller 508 detects flicker components without dividing the region within the frame, and then proceeds to a step S913. Note that the step S913 to a step S915 following the step S912 are the same as the steps S712 to S714 in the above-described first embodiment (FIG. 7), and therefore description thereof is omitted.

As described above, in the present embodiment, in the case where there is a pixel region in which the driving method is changed within the frame of the image pickup device 500, a flicker component is detected in the second region used for phase difference detection at a flicker detection period two times as long as that in the first and third regions not used for phase difference detection.

Then, flicker correction values for the first to third regions are calculated, on a region-by-region basis, and flicker correction is performed for the first to third regions, on a region-by-region basis, based on the calculated flicker correction values. This makes it possible to accurately detect and correct a flicker even when the image pickup device 500 is configured such that the driving method thereof is changed within the frame, on a region-by-region basis.

Other configurations and advantageous effects are the same as provided by the above-described first embodiment.

Next, a digital camera as an image processing apparatus according to a third embodiment of the present invention will be described with reference to FIG. 10. Note that in the present embodiment, redundant description of components identical or corresponding to those of the above-described first and second embodiments is omitted while denoting them by the same reference numerals, and the following description is given of only different points from the first and second embodiments. Further, the system configuration of the digital camera according to the present embodiment is the same as the system configuration of the second embodiment shown in FIG. 8.

In a case where flicker detection is performed in each of the first to third regions in the above-described second embodiment, there is a possibility that the flicker detection cannot be performed accurately if the number of lines (horizontal readout lines) indicated by a vertical line portion in the second region for phase difference detection is small.

To solve this problem, in the present embodiment, in a case where the number of lines in the second region used for phase difference detection is not more than a predetermined number of lines, the detection and correction of flicker are performed using only flicker detection information of the first and third regions, i.e. of pixel regions for a normal image, without using the region for phase difference detection.

Figure 10:
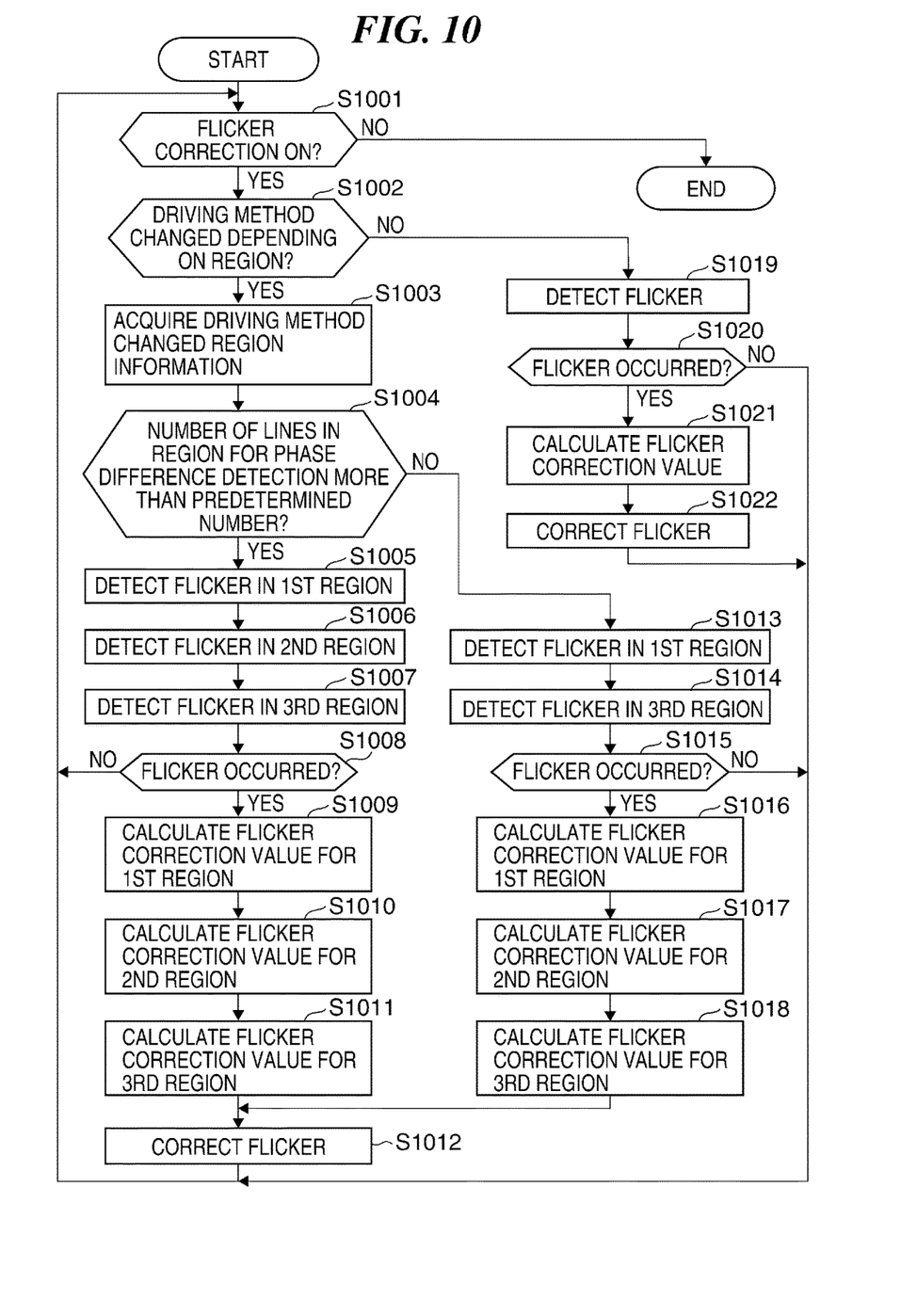
FIG. 10 is a flowchart of a flicker correction process performed by a digital camera as an image processing apparatus according to a third embodiment of the present invention.

FIG. 10 is a flowchart of a flicker correction process performed by the camera as an image processing apparatus under the control of the system controller 508 thereof. The flicker correction process shown in FIG. 10 is performed by the CPU and the like of the system controller 508 which executes a program loaded from a storage section, such as the nonvolatile memory 510, into the system memory 509.

Steps S1001 to S1003, steps S1005 to S1012, and steps S1019 to S1022 in FIG. 10 are the same as the steps S901 to S303, the steps S904 to S911, and the steps S912 to S915 in FIG. 9, respectively, and therefore description thereof is omitted.

Referring to FIG. 10, in a step S1004, the system controller 508 determines whether or not the number of lines in the second region of the image pickup device 500 which is used for phase difference detection is more than a predetermined number of lines. Note that for example, the predetermined number as a threshold is effective for improving the accuracy of flicker detection, if it is set to a number not more than e.g. a tenth of the number of all lines of the image pickup device 500. If the number of lines in the second region is more than the predetermined number of lines, the system controller 508 executes the steps S1005 to S1012 which is the same as the steps S904 to S911 in FIG. 9. On the other hand, in a case where the number of lines in the second region used for phase difference detection is not more than the predetermined number of lines, the system controller 508 proceeds to a step S1013 et seq.

In the step S1013 and a step S1014, the system controller 508 causes the flicker detection section 505 to detect flicker components in the first and third regions other than the second region used for phase difference detection, respectively, and then proceeds to a step S1015.

In the step S1015, the system controller 508 determines whether or not a flicker has occurred in the frame, based on information on the flicker components detected in the steps S1013 and S1014. If a flicker has occurred, the system controller 508 proceeds to a step S1016, whereas if no flicker has occurred, the system controller 508 returns to the step S1001, and continues the steps subsequent thereto.

In the step S1016 and steps S1017 and S1018, the system controller 508 causes the flicker correction value calculation section 506 to calculate flicker correction values for the respective first to third regions, on a region-by-region basis, based on information on the flicker components detected in the steps S1013 and S1014, and then proceeds to the step S1012. In the step S1012, the system controller 508 causes the flicker correction section 507 to perform flicker correction based on the flicker correction values calculated in the steps S1016 to S1018, and then returns to the step S1001 to continue the steps subsequent thereto.

As described heretofore, in the present embodiment, in the case where the number of lines in the second region used for phase difference detection is not more than the predetermined number of lines, the detection and correction of a flicker are performed using only the flicker components detected in the first and third regions for an image instead of using the flicker detection information of the second region. As a consequence, even in the case where the number of lines in the second region used for phase difference detection is not more than the predetermined number of lines, it is possible to accurately detect a flicker. Other configurations and advantageous effects are the same as provided by the above-described first and second embodiments.

While the present invention has been described with reference to exemplary embodiments, it is to be understood that the invention is not limited to the disclosed exemplary embodiments.

Although in the above-described embodiments, the description is given of the case where the region within the frame is divided into the region used for phase difference detection and the regions not used for phase difference detection, by way of example, this is not limitative, but the region used for phase difference detection may be replaced by regions arranged discretely in the image pickup device 500.

Further, although in the above-described embodiments, the digital camera as an example of the image pickup apparatus is shown as the image processing apparatus of the present invention by way of example, this is not limitative, but there may be used image pickup apparatuses other than the digital camera, such as portable devices including a digital video camera and a smart phone, and a security camera.

Further, one or more of function blocks appearing in FIGS. 1 and 8 may be realized by hardware, such as an ASIC (application specific integrated circuit) or a programmable logic array (PLA), or may be realized by a programmable processor, such as a CPU or an MPU, that executes software. Further, one or more of the function blocks may be realized by combining software and hardware. Therefore, in the following description, even in a case where different processing operations are described to be executed by respective different function blocks, the execution of the different processing operations can be realized by the same hardware unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The scope of the following claims is to be accorded the broadest interpretation so as to encompass all such modifications and equivalent structures and functions.

This application claims the benefit of Japanese Patent Application No. 2016-077931 filed Apr. 8, 2016 which is hereby incorporated by reference herein in its entirety.

What is claimed is:

1. An image processing apparatus comprising:
at least one processor programmed to perform the functions of a flicker detection unit configured to detect a flicker component of an image pixel signal, which is read out from an image pickup device that includes a pixel region for phase difference detection and is capable of changing a driving method, on a region-by-region basis, within a frame,
wherein in a case where the driving method for driving the image pickup device is changed to a driving method for performing phase difference detection, said flicker detection unit detects the flicker component such that, within the frame, a period of the flicker component in a region used for phase difference detection coincides with a period of the flicker component in a region not used for phase difference detection.

2. The image processing apparatus according to claim 1, further comprising a drive circuit configured to read out a signal from the image pickup device,
wherein the pixel region for phase difference detection is a region of the image pickup device, in which pixels including a first photoelectric converter and a second photoelectric converter are arranged in a row direction, and
wherein said drive circuit reads out not only a signal generated by adding a first signal output from the first photoelectric converter and a second signal output from the second photoelectric converter but also the first signal, from the pixel region for phase difference detection, and reads out the signal generated by adding the first signal and the second signal from a pixel region not for phase difference detection.

3. The image processing apparatus according to claim 1, wherein said flicker detection unit selects flicker detection lines such that a frequency of the flicker in the region used for phase difference detection coincides with a frequency of the flicker in the region not used for phase difference detection, and detects a flicker component from the selected flicker detection lines.

4. The image processing apparatus according to claim 1, wherein the at least one processor is further programmed to perform the functions of a correction unit configured to correct the flicker component of the image pixel signal based on information on the flicker component detected by said flicker detection unit.

5. The image processing apparatus according to claim 4, wherein said flicker detection unit detects the flicker component in each of the region used for phase difference detection and the region not used for phase difference detection, and
wherein said correction unit corrects the flicker component in each region based on the information on the flicker component detected by said flicker detection unit.

6. The image processing apparatus according to claim 5, wherein said flicker detection unit detects the flicker component in each region based on a difference between a time period required to read out the image pixel signal in the region used for phase difference detection and a time period required to read out the image pixel signal in the region not used for phase difference detection.

7. The image processing apparatus according to claim 5, wherein in a case where the number of lines in the region used for phase difference detection is not more than a predetermined number, said flicker detection unit does not use the region used for phase difference detection, for detection of the flicker component.

8. An image processing apparatus comprising:
a drive circuit configured to be capable of changing a driving method for driving an image pickup device between a first driving method in which a time period during which charge accumulation of one line of the image pickup device is completed is different, on a region-by-region basis, in the image pickup device, and a second driving method in which the time period is approximately equal between regions of the image pickup device; and
at least one processor programmed to perform the functions of a flicker detection unit configured to perform flicker detection processing based on a pixel signal read out from the image pickup device,
wherein said flicker detection unit makes lines of the image pickup device each for reading out a pixel signal used in the same flicker detection processing, different between a case where the image pickup device is driven by the first driving method and a case where the image pickup device is driven by the second driving method.

9. The image processing apparatus according to claim 8, wherein the first driving method is a method of driving the image pickup device in which, from a first region of the image pickup device, a pixel signal for phase difference detection and a pixel signal for recording are read out from each same line of the image pickup device, and from a second region of the image pickup device different from the first region, only the pixel signal for recording is read out from each same line of the image pickup device, and
wherein the second driving method is a method of driving the image pickup device in which from the first region and the second region, only the pixel signal for recording is read out from each same line of the image pickup device.

10. The image processing apparatus according to claim 9, wherein in a case where the image pickup device is driven by the first driving method, said flicker detection unit sets lines of the image pickup device for reading out a pixel signal used in the same flicker detection processing such that a light amount change period of a detected flicker in the first region and a light amount change period of a detected flicker in the second region coincide with each other.

11. The image processing apparatus according to claim 10, wherein said flicker detection unit performs thinning-out readout from lines of the image pickup device associated with the second region, to thereby cause the light amount change period of the detected flicker in the first region and the light amount change period of the detected flicker in the second region to coincide with each other.

12. The image processing apparatus according to claim 9, wherein in a case where the image pickup device is driven by the first driving method, said flicker detection unit performs the flicker detection process in each of the first region and the second region.

13. The image processing apparatus according to claim 12, wherein in the case where the image pickup device is driven by the first driving method, said flicker detection unit makes different a detection period used for determining a light amount change period of a flicker detected based on pixel signals read out from the image pickup device, between the first region and the second region.

14. A method of controlling an image processing apparatus including an image pickup device that includes a pixel region for phase difference detection and is capable of changing a driving method, on a region-by-region basis, within a frame, the method comprising:
detecting a flicker component of an image pixel signal read out from the image pickup device,
wherein in a case where the driving method for driving the image pickup device is changed to a driving method for performing phase difference detection, said detecting a flicker component includes detecting the flicker component such that, within the frame, a period of the flicker component in a region used for phase difference detection coincides with a period of the flicker component in a region not used for phase difference detection.

15. A method of controlling an image processing apparatus, comprising:
performing flicker detection processing based on pixel signals read out from an image pickup device that is capable of changing a driving method for driving the image pickup device between a first driving method in which a time period during which charge accumulation of one line of the image pickup device is completed is different, on a region-by-region basis, in the image pickup device, and a second driving method in which the time period is approximately equal between regions of the image pickup device; and
wherein said flicker detection processing includes making lines of the image pickup device each for reading out a pixel signal used in the same flicker detection processing, different between a case where the image pickup device is driven by the first driving method and a case where the image pickup device is driven by the second driving method.

16. A non-transitory computer-readable storage medium storing a computer-executable program for executing a method of controlling an image processing apparatus including an image pickup device that includes a pixel region for phase difference detection and is capable of changing a driving method, on a region-by-region basis, within a frame,
wherein the method comprises:
detecting a flicker component of an image pixel signal read out from the image pickup device,
wherein in a case where the driving method for driving the image pickup device is changed to a driving method for performing phase difference detection, said detecting a flicker component includes detecting the flicker component such that, within the frame, a period of the flicker component in a region used for phase difference detection coincides with a period of the flicker component in a region not used for phase difference detection.

17. A non-transitory computer-readable storage medium storing a computer-executable program for executing a method of controlling an image processing apparatus,
wherein the method comprises:
performing flicker detection processing based on pixel signals read out from an image pickup device that is capable of changing a driving method for driving the image pickup device between a first driving method in which a time period during which charge accumulation of one line of the image pickup device is completed is different, on a region-by-region basis, in the image pickup device, and a second driving method in which the time period is approximately equal between the regions of the image pickup device; and
wherein said flicker detection processing includes making lines of the image pickup device each for reading out a pixel signal used in the same flicker detection processing, different between a case where the image pickup device is driven by the first driving method and a case where the image pickup device is driven by the second driving method.

* * * * *